April 8, 1958  R. W. BROWN  2,829,424
WORK ORIENTING MECHANISM
Filed Dec. 30, 1954  5 Sheets-Sheet 1
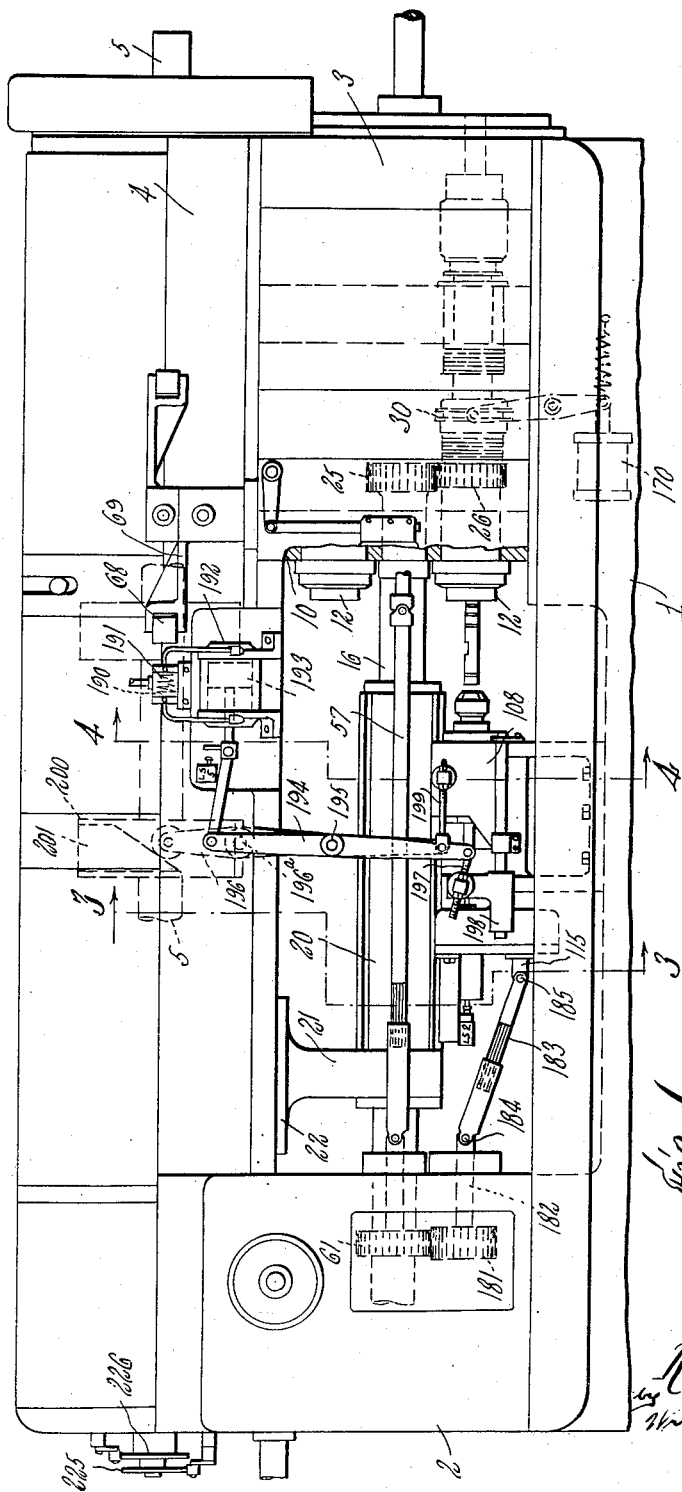
Inventor
Roger W. Brown April 8, 1958     R. W. BROWN     2,829,424
WORK ORIENTING MECHANISM
Filed Dec. 30, 1954     5 Sheets-Sheet 2
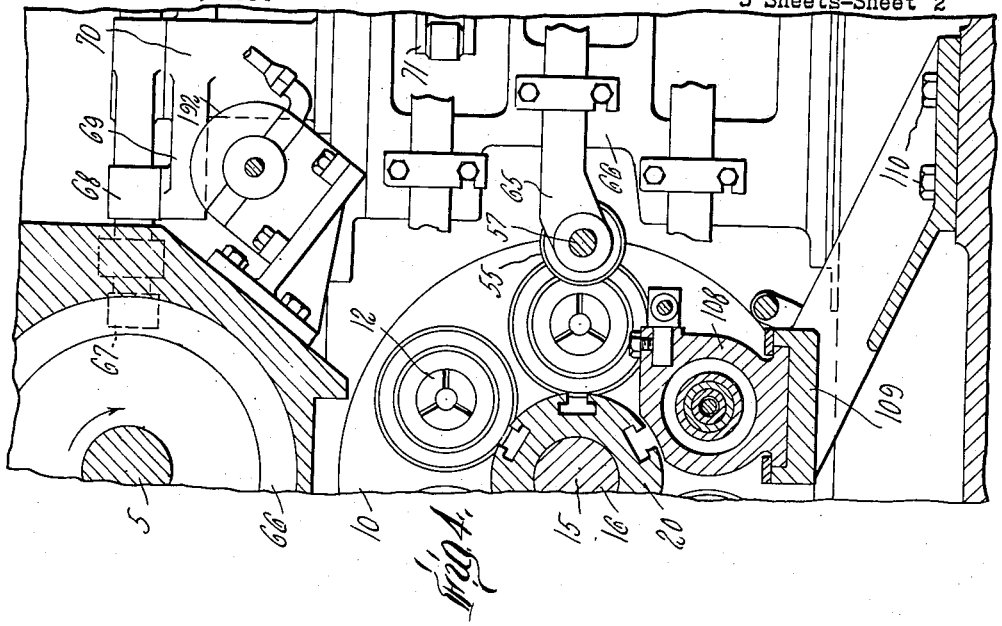
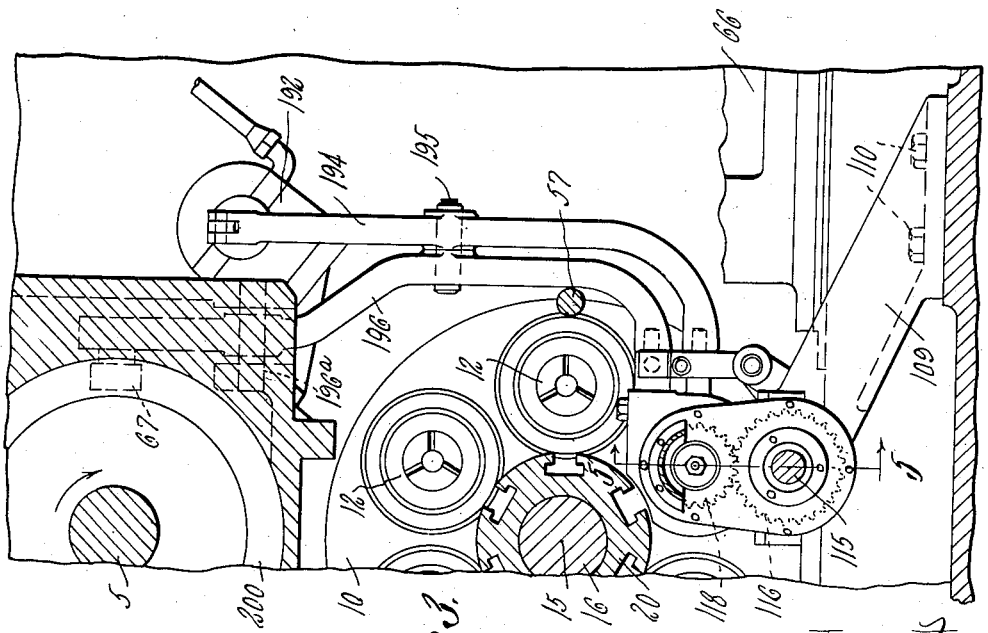
Inventor
Roger W. Brown

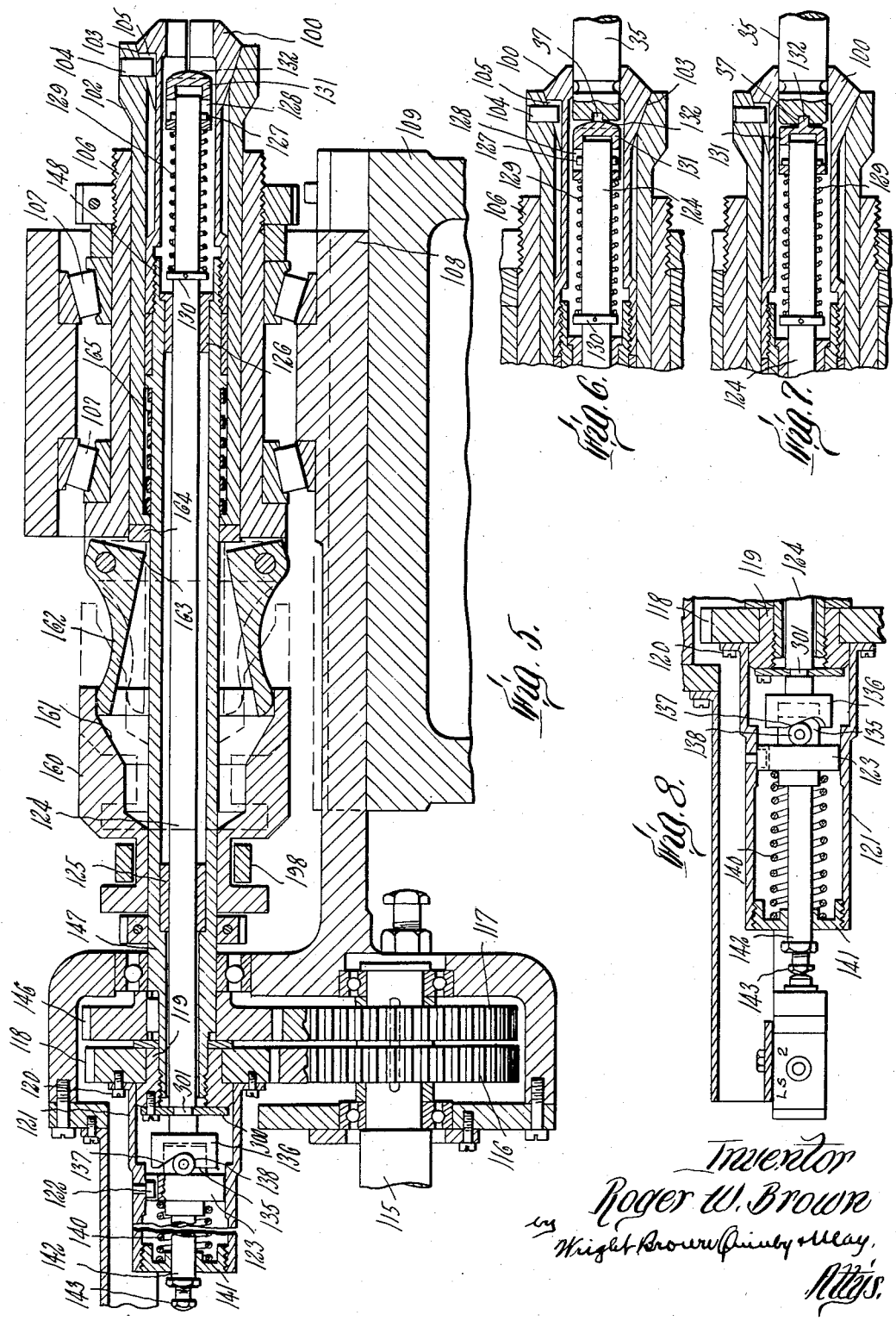

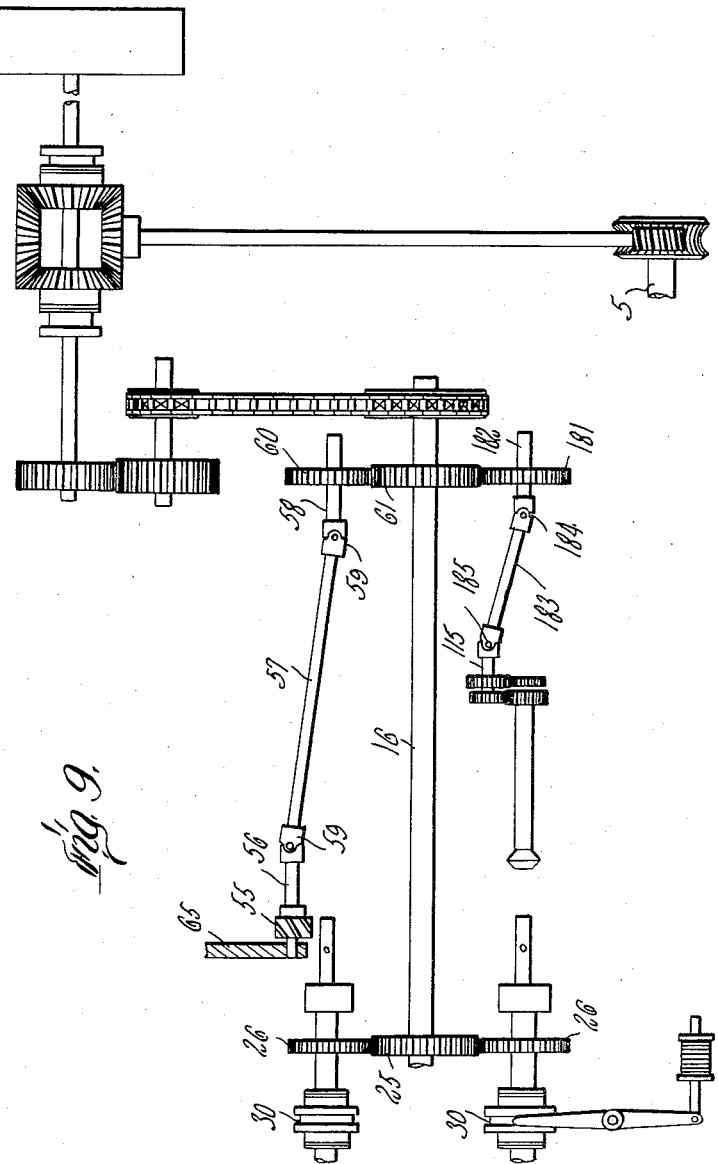

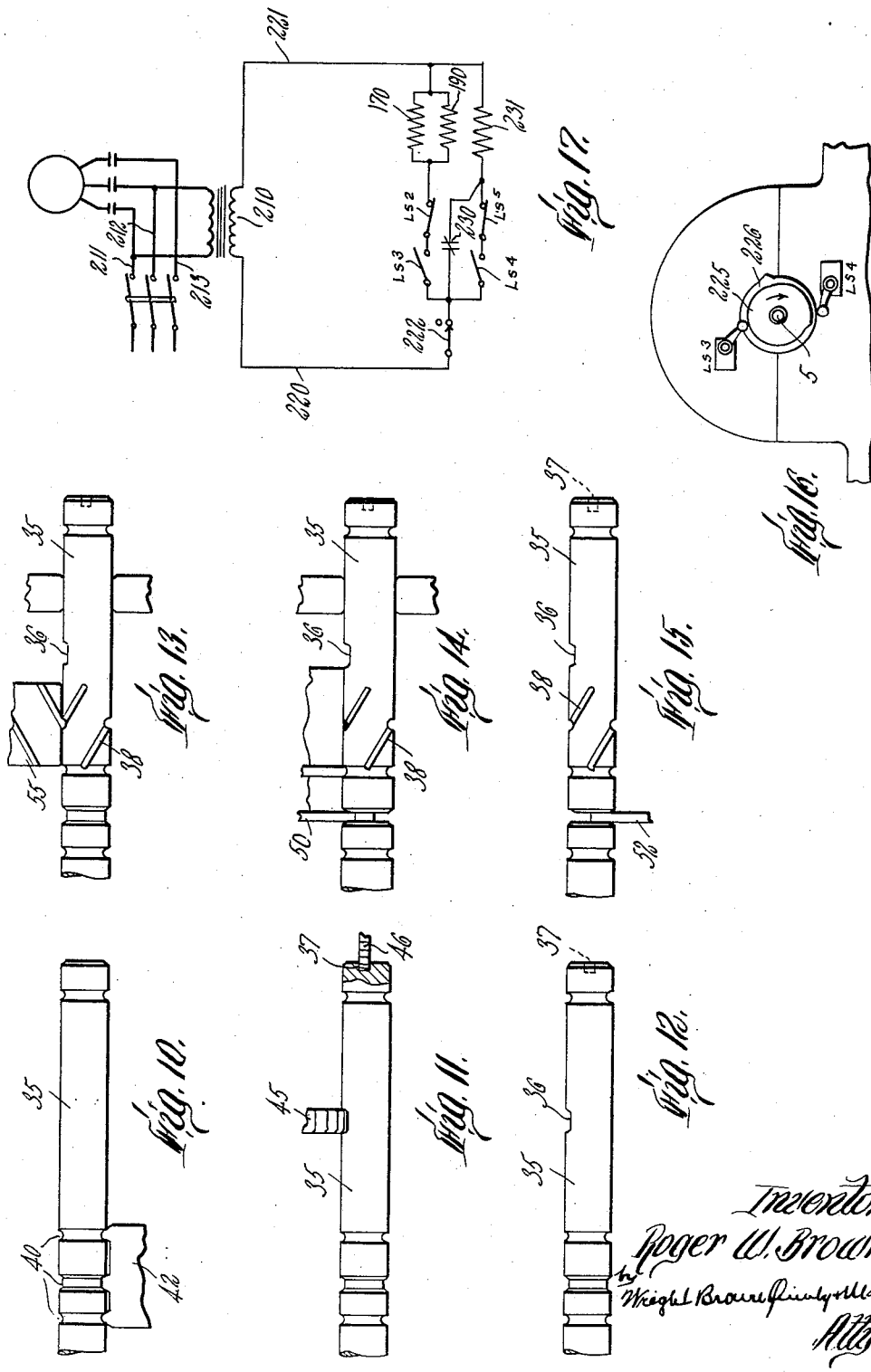

United States Patent Office 2,829,424
Patented Apr. 8, 1958

2,829,424

WORK ORIENTING MECHANISM

Roger W. Brown, Windsor, Vt., assignor to Cone Automatic Machine Company Inc., Windsor, Vt., a corporation of Vermont Application December 30, 1954, Serial No. 478,624

5 Claims. (Cl. 29—57)

In the machining of parts by successive tooling operations, it is often important that definite relationship be established in the angular positioning of the various parts in the completed articles, for example, and as shown in this application, between a transverse slot in the end of the work piece, and eccentrically disposed oil grooves in its periphery. Where these various operations are to be performed at different tooling stations as in a multiple spindle lathe, and particularly where the first operation is performed while the work is not being rotated, the establishment of the angular relationship between these successive operations presents particular difficulties. An important object of the present invention, therefore, is to solve these difficulties.

In accordance with this invention this is done, after the completion of the first operation, by rotating the work piece by a shaft rotating at slightly different speed than that of the work-carrying spindle so that there is a slow relative rotation therebetween. When the work piece reaches a definite angular relation to the spindle a feeler which engages the work piece at the first machined part acts to release the work piece from the shaft, and cause it to be gripped by the spindle. This provides a definite angular position for the work piece relative to the spindle, which position may be adjusted with respect to the definite angular position of the second operation so that the second operation is performed in desired angular relation to the first operation.

For a complete understanding of this invention, reference may be had to the accompanying drawings in which Figure 1 is a fragmentary rear elevation of a multiple spindle lathe embodying the invention.

Figure 2 is a side elevation of a finished work piece which it may be desired to form on the machine of Figure 1.

Figures 3 and 4 are detail sectional views on lines 3—3 and 4—4, respectively, of Figure 1.

Figure 5 is a detail sectional view to a larger scale on line 5—5 of Figure 3, the mechanism being retracted from the work.

Figure 6 is a view similar to the right hand portion of Figure 5, but showing the work piece engaged but not yet in driven relation to the inner shaft.

Figure 7 is a view similar to Figure 6, but showing the work piece in driven relation to the inner shaft.

Figure 8 is a view similar to the left hand portion of Figure 5, but with the parts in the work-engaging angular and axial position of Figure 7.

Figure 9 is a somewhat diagrammatic view showing the driving mechanism for the grooving roll and spindles.

Figures 10 to 15, inclusive, are diagrams illustrating tooling operations which may be performed at successive tooling stations of the machine.

Figure 16 is a fragmentary end elevation of the machine showing certain cam shaft actuated electric switches.

Figure 17 is a wiring diagram for the angular position control mechanism for the work piece for insuring the proper angular relationship between certain tooling operations.

Referring first to Figure 1, there is shown a multiple spindle lathe of well known type having a bed 1 from the ends of which arise columns 2 and 3 which are joined by a top frame member 4. Within this top frame member 4 there is journaled a cam shaft 5 having various cams positioned thereon, certain of which have to do with the subject matter of this invention.

Within the column 3 there is positioned a spindle carrier 10 within which are rotatably mounted a plurality of rotary work-carrying spindles 12, these spindles being arranged in parallel circular array about the central axis 15 of the carrier. Located coaxially with this carrier is a bar 16 which extends into the other column 2 and has mounted thereon for axial sliding motion, a turret member 20. This turret member may have secured thereto an arm 21 depending from a slide 22 which is slidably guided for axial motion in the under portion of the top frame member 4. As is well known in the art, the slide 22 may be moved axially as by suitable cams (not shown), on the cam shaft 5.

The several spindles 12 are arranged to support stock, which is indexed from one to a succeeding tooling station by indexing of the carrier 10 about its axis 15, thus to present the work pieces carried by the several spindles successively into each of the tooling stations. As shown, there are six of these rotary spindles 12, though the number may be more or less as desired.

Each of the work spindles is capable of being rotated, and for this purpose the central bar or shaft 16 is mounted for rotation and carries within the column 3, a gear 25 with which mesh gears 26, there being one gear 26 for each of the spindles 12 and each gear 26 being connected through a clutch 30 to its respective spindle. Thus so long as the clutches are closed, all of the work spindles are rotated in unison and in definite angular relationship to the gear 25 and to the bar or shaft 16.

Any suitable means may be provided for rotating the bar 16 to thereby effect rotation of the several spindles so long as their respective clutches 30 are closed. Suitable means not material to this invention are employed to feed bar stock through the spindles at suitable intervals, the parts of the bar projecting forwardly of the spindles being acted upon by the various tools of the machine at their respective tooling angular portions.

The particular article which it is desired to make, as shown in Figure 15 of the drawings of this application, is a cylindrical piece 35 having a flat 36 formed therein in definite relationship to an end slot 37 and oil grooves 38 which are angularly related in a predetermined definite manner to the flat 36 and to the slot 37.

Figures 10 to 15 illustrate various tooling operations which may be performed at the various stations, Figure 10 representing the first station where the portion of the stock which projects forwardly from the work spindle is cut to present the peripheral grooves 40 in definite spaced relation as accomplished by the tool 42.

At the second station (Figure 11) the spindle clutch 30 is opened so that the rotation of the work piece ceases and a flat 36 is milled across one portion of the periphery as by a milling cutter 45, and a cutter 46 is presented to the exposed end of the work piece and a slot 37 is milled thereacross in definite angular relation to the flat 36. At the third station the work piece is unclutched from and then clutched to the spindle in a definite angular relation thereto, the rotation of the work piece then being resumed. The operations performed at this third station are those particularly important in connection with the subject matter of this invention, since they act to position the work piece relative to its spindle in a definite angular relation to the succeeding tooling operation which is illustrated in Figure 13 in the fourth station, and as shown comprise the formation of the oil grooves 38. When this has been accomplished the work may be further machined at the fifth station (Figure 14) to remove any burs occasioned by the grooving tools, and the work piece is partly severed from the bar stock of which it is made by the break-down tool 50, which engages in the central peripheral groove of the three shown at 40 in Figure 10. At the sixth station the completed work piece is cut off from the bar stock, as by the cut-off tool 52.

The groove rolling operation is performed in definite angular relation to the drive mechanism for the spindles as illustrated in Figure 9, wherein the groove rolling tool 55 is shown as rotated through a plurality of shafts 56, 57 and 58 connected together by universal joints 59 through a gear 60 secured to the shaft portions 58 and meshing with a gear 61 secured to the bar or shaft 16. It will also be noted that the shaft 16 is connected to drive the several spindles through the gear 25 carried by the bar 16 and which mesh with the spindle gears 26, as previously mentioned. The grooving roll 55 is thus driven in a definite angular relation to the bar 16 and it is presented to and retracted from the work piece by axial motion of a carrying bar 65 on a back tool slide 66 (see Figure 4), the motion of which is controlled by suitable cams (not shown) on the drum 66 carried by the overhead cam shaft 5, as shown on Figures 1 and 4. The follower roll 67 (Figure 4), moved by these cams, is connected through a slide bar 68 and a rock arm 69 to a rocking sleeve 70, connected through links 71 to the back tool slide 66, all as is well known in the art.

From the foregoing it will be clear that not only is the angular position of the rolling tool 55, but also its presentation and retraction with respect to the work, in definite relation to the angular position of the cam shaft 5. In order that the oil grooves rolled by this tool may be in definite angular relation to the flat 36 and the slot 37 of the work piece, it will be necessary that the work piece be gripped by the spindle in the rolling station in the proper angular relation thereto, and mechanism for closing the spindle clutch when this relationship has been established is an important feature of this invention.

Referring more particularly to Figures 5 to 7, there is illustrated a collet 100 having an inclined inner face 103 which is movable with respect to the collet actuating sleeve 102 axially, but is prevented from rotation relative thereto as by a pin 104 in the collet actuating sleeve slidable in a slot 105 in the collet. The collet actuating sleeve 102 is held within a sleeve 106 which is journaled for rotation in suitable bearings 107 in a slide 108 mounted for motion parallel to the work spindle axes in a guide member 109 which is fixed to the bed of the machine, as by the screws 110 (see Figures 3 and 4).

The slide 108 has journaled therein a shaft 115 to which is splined a pair of gears 116 and 117. The gear 116 meshes with a gear 118 which is journaled on a sleeve 119 and is connected, as by screws 120, to a tubular member 121 keyed as by a key 122 to a disk 123. This disk 123 is coaxial with a shaft 124. This shaft 124 is journaled in bearing collars 125 and 126 coaxially with the collet 100. Within the collet 100, the shaft 124 has keyed thereto a work feeler so formed as to engage the machined portion of the work piece when this portion is in the proper angular relation to the spindle for the later machining operations, and to close the spindle clutch so that the work piece is then rotated by the spindle with the machined part properly correlated to the later machining operations.

The shaft 115 is driven from the shaft 16 through the intermeshing gears 61 and 181 carried by the shaft 16 and a shaft 182, respectively, as shown in Figure 1, the shaft 182 being connected through the extensible shaft 183 and the universal joints 184 and 185 with the shaft 115.

Since, as shown herein, the early machining operations result in the formation of a slot 37 on the end of the work piece, the work feeler here employed is a head 131 having a transverse fin 132 at its outer end adapted to enter the slot 37 on the end of the work piece when the work piece and the head 131 and the shaft 124 are in proper relative regular relations for the fin 132 to enter the slot 37. The head 131 is normally pressed outwardly as far as permitted by the key pin 127 therein engaging in a slot 128 in the head, which prevents relative rotation between the head 131 and the shaft 124, as by a coil spring 129 surrounding the shaft 124 and bearing at one end against the rear face of the head 131 and at the other end against a collar 130 pinned to the shaft 124. The disk 123 has a forward extension 135 which enters into a cup shaped cam element 136 secured to the end of the shaft 124, this cam element having an edge cam face 137 against which bears a cam follower roller 138 carried by the extension 135. The cam follower roller 138 and the cam member 136 act normally as a clutch to connect the shaft 124 for rotation by the gear 118, but should the shaft 124 meet a resistance to its turning motion in such a way as to cause the cam roller 138 to rise on the cam surface 137, the disk 123 is moved bodily to the left, as viewed in Figure 8, against the action of a spring 140 which bears at one end against this disk and at the other against a cap 141 threaded into the outer end of the tubular member 121. This has the effect of projecting a stem 142 carried by the disk 123 outwardly, this stem having an adjustable abutment formed as a screw 143 threaded thereinto, and for a purpose which will later appear.

The collet 100 is rotated from the same shaft 115 as the shaft 124, by means of a gear 146 keyed to the collet tube 147 to the forward end of which the collet 100 is secured as by the threaded connection at 148. The shaft 124, however, is driven at a slightly different speed than the collet, the intermeshing gears 116, 118 and 117 and 146 being of slightly different sizes. For example, the shaft 124 may be driven at 572 R. P. M. which is that of the work spindle, while the collet 100 is being driven at 568 R. P. M. The shaft 124 is held against axial motion with respect to the slide 108 by a plate 300 engaging in a peripheral groove 301 in the shaft 124.

When the work piece which has been machined to produce the flat 36 and the slot 37 reaches the third station when it is in alinement with the collet 100, the mechanism carried by the slide 108 is moved axially by cams (not shown) on the cam drum 200 so that the work piece carried by the alined work spindle enters the collet 100, which is then in open position. The spindle clutch 30 driving the work piece is then opened and the collet 100 is closed on the work. Closing of the collet 100 is produced by the forward motion of the collet-closing sleeve 160 which has an interior cam face 161 which presses the outer ends of the pivoted collet fingers 162 inwardly. The portions 163 of these fingers engage the collet actuating sleeve 102 through a wear ring 164, against the pressure of a coil spring 165, forcing the collet actuating sleeve 102 to the right. This work piece is at that time gripped by the collet of its spindle but since the clutch for this spindle has been opened at this time the work and both collets are rotating at a speed slightly different from the spindle speed, and as assumed at less speed, and the work is pressed against the end of the feeler head 131 which is rotating at a slightly different rate of speed which is the spindle speed. Thus the fin 132, which may not initially be in proper angular position to engage in the slot 37 (see Figure 6), soon comes into such position because of the slightly different rates of rotation between the work piece and the head 131, and as soon as this occurs the fin 132 is snapped into the slot 37 by the spring 129

(see Figure 7), whereupon the shaft 124 is immediately caused to rotate at the same speed as the collet 100. Since this speed is slightly different from the speed of rotation of the tubular member 121 and the clutch member 123, the follower roll 138 is caused to ride up the incline 137, projecting the stem 142 with its adjustable abutment member 143 to the left, this being as shown in Figure 8. This abutment member 143 engages a micro switch LS2, opening this switch, which immediately deenergizes the solenoids 170 and 190 (see Figure 1). Deenergizing the solenoid 170 closes the clutch 30 and starts the rotation of the work piece by its supporting spindle, while deenergizing the solenoid 190 opens the collet 100 as follows.

The solenoid 190 controls a valve 191 to admit fluid under pressure to one or the other end of a cylinder 192 (see Figure 1). This causes the piston 193 therein to move in a direction to rock a lever 194 fulcrumed at 195, on a second lever 196 to advance or retract the collet-closing member 160 and close or open the collet 100 through a link 197 and a slide 198, connected to the sleeve 160. Suitable cams (one shown at 201) in Figure 1 on a cam drum 200 carried by the cam shaft 5, act upon the lever 196 fulcrumed at 196a and through a link 199 to advance or withdraw the slide 108, to advance or remove the collet 100 and the parts carried with respect to the work piece while it is grasped by the driving spindle. The work is now driven by the spindle with its machined parts in a definite angular relation thereto.

It is evident from Figure 9 of the drawings that the groove rolling tool 55 is constantly in geared connection with the spindle-driving gears 26 and also with the gears 116, 118 and thus with the disk 123. Thus the tool 55 and the disk 123 always rotate in step. Hence if a work-piece held by the work spindle 12 at the third station (i. e. opposite the collet 100) is given a predetermined angular relation to the disk 123 and its clutch 30 is closed when it is in such relation, it will thereafter have a predetermined angular relation to the tool 55 when it is indexed to the fourth operating station at which station it will be operated on by the tool 55. The shaft 124 which carries the feeder 132 is in step with the disk 123 except when its engagement with a work-piece changes it from the relative position shown in Figure 5 to that shown in Figure 8. To allow for this angular difference between the disk 123 and work-piece at the moment when the collet 100 releases the work-piece and the clutch 30 closes, the abutment member 143 is adjustable.

When the machine is set up, a test piece is first made to see how far off the oil groove is degree-wise from the end slot, then the correct adjustment is made on the adjustable abutment 143 so that the grooving rolls and the slot are in the precise angular relation desired, after which the machine may be operated normally with assurance that the grooving roll will always contact the work in the correct relation to the slot and flat on the work.

In Figure 17 there is shown a wiring diagram of the spindle clutch and collet clutch mechanism as controlled by the angular position of the cam shaft 5. The control mechanism is actuated from the secondary of a transformer 210 the primary winding of which is energized from two lines 211 and 212 of a three-phase power supply having the third phase line 213 and which controls the main motor M which operates the entire machine. From the secondary leads 220, 221 power is supplied through a manually operable switch 222, situated at any convenient position, to the switches LS3 and LS4 in parallel and controlled by suitable cams 225 and 226 on the cam shaft 5. When the switch LS3 is closed and the switch LS2 is opened by the engagement thereon of the abutment 143, the solenoids 170 and 190 are deenergized, allowing the spindle clutch to close on the work and opening the auxiliary collet 100. 230 is a switch which is open when the supply of air pressure for actuating the piston 193 is present so that if such pressure is lacking the power feed knock-off 231 will be energized and shut down the machine. The switch LS5 is closed by the air piston 193 when the collet 100 is closed, so that should the cam shaft actuated switch LS4 be closed at the same time, the power feed knock-off will be energized and the machine will shut down.

From the foregoing description of certain embodiments of this invention, it will be evident to those skilled in the art that various changes and modifications may be made therein without departing from its spirit or scope.

I claim:

1. In combination, a rotary spindle for carrying a work piece, means including a clutch for rotating said spindle when said clutch is closed, an axially movable rotary locating shaft in coaxial relation to said rotary spindle, a second spindle shaft in coaxial relation to said rotary spindle, work grippers carried by said spindle and spindle shaft for gripping opposite end portions of the work piece, means for rotating said locating shaft and spindle shaft at slightly different velocities, the velocity of said spindle shaft being the same as that of said rotary spindle when said clutch is closed, a feeler carried by said shaft, yielding means pressing said feeler axially against the work piece, said work piece and feeler having parts interengaging when said work piece and locating shaft are in a definite angular relation, means actuated by relative angular motion between said locating shaft and its rotating means when said feeler is engaged by the work piece for moving said locating shaft driving means axially, and means actuated by such axial motion of said locating shaft driving means when said work piece and locating shaft are in said relative angular relation for closing said clutch for connecting the work piece to be rotated by the rotation of said spindle and with said work piece in definite angular relation to said spindle and for disconnecting the work piece from driven relation to said spindle shaft.

2. In combination, a rotary spindle for carrying a work piece, means including a clutch for rotating said spindle, a carriage movable parallel to said spindle, a hollow spindle shaft journaled in said carriage in substantially axial alinement with said spindle, a locating shaft arranged coaxially within said spindle shaft, means for rotating said spindle shaft and locating shaft at slightly different velocities and said locating shaft at the same velocity as said spindle when said clutch is closed, work gripping means carried by said spindle shaft for gripping a work piece projecting from said spindle when said carriage is advanced toward said spindle and while said spindle clutch is open, means for advancing and rectracting said carriage, a feeler carried by said locating shaft responsive to the angular location of a machined part on said work piece for opening said gripping means and closing said clutch when said machined part is in predetermined angular relationship to said spindle and when said carriage is in advanced position, and means for performing a further machining operation on said work piece while it is rotated by said spindle and said carriage is retracted and in predetermined angular relation to the rotation of said spindle, whereby said second machining operation is performed in predetermined angular relation to said machined part.

3. In combination, a rotary spindle for carrying a work piece, means including a clutch for rotating said spindle, a carriage movable parallel to said spindle, a hollow spindle shaft journaled in said carriage in substantially axial alinement with said spindle, a locating shaft arranged coaxially within said spindle shaft, means for rotating said spindle shaft and locating shaft at slightly different velocities, work gripping means carried by said spindle shaft for gripping a work piece projecting from said spindle when said carriage is advanced toward said spindle and while said spindle clutch is open, means for advancing and retracting said carriage, a feeler carried by said locating shaft responsive to the angular location of a machine part on said work piece for opening said gripping means and closing said clutch when said machined part is in predetermined angular relationship to said spindle and when said carriage is in advanced position, and means for performing a further machining operation on said work piece while it is rotated by said spindle and said carriage is retracted and in predetermined angular relation to the rotation of said spindle, whereby said second machining operation is performed in predetermined angular relation to said machined part.

4. In combination, a rotary spindle for carrying a work piece, means including a clutch for rotating said spindle, a carriage movable parallel to the axis of said spindle, a spindle shaft journaled in said carriage in substantially axial alinement with said rotary spindle, means for rotating said spindle shaft at a slightly different rate than said spindle when said clutch is closed, work gripping means carried by said spindle shaft in position to grasp a work piece carried by and projecting from said rotary spindle, the work piece having a slot in one end, a locating shaft journaled coaxially within said spindle shaft, a feeler head keyed to said locating shaft and having a fin adapted to engage in said work piece slot, spring means for pressing said head against said work end, means including a cam member and follower for rotating said locating shaft at the same rate of speed as said spindle, one of said members being carried by said locating shaft and the other of said members being movable lengthwise of said locating shaft in accordance with the angular relation between said members as controlled by the cam contour of said cam, means for moving said carriage toward and from said spindle and when toward said spindle with said spindle shaft work gripper in position to grip a work piece carried by said spindle, means controlled by the axial position of said movable member to close said spindle shaft gripper on the work piece while opening said chuck, whereby when said fin and work slot are in proper relative angular position, said head with said fin will engage said work and rotate said work piece at the rate of rotation of said locating shaft to relatively turn said members and move said movable member axially, and means responsive to the axial motion of said movable member for opening said gripping mechanism and closing said clutch, whereby said work piece is rotated by said spindle at a predetermined angular relation thereto, and means for moving said carriage to present and remove said spindle shaft gripper with relation to the work piece.

5. In combination, an indexable carrier, a plurality of rotary work carrying spindles arranged in said carrier for presentation successively into a plurality of tooling stations, a carriage movable lengthwise of a spindle in one of said stations, a hollow spindle shaft journaled in said carriage in axial alinement with a spindle in said station, a locating shaft arranged coaxially within said spindle shaft, means including a clutch for rotating each of said spindles at a predetermined rate of speed when the corresponding clutch is closed, tooling means located at a station in advance of said one station for machining a part of a work piece projecting from the work carrying spindle at said advance station, a feeler carried by said locating shaft responsive to the angular location of said machined part, means for rotating said spindle shaft and locating shaft at slightly different angular velocities, a work gripper carried by said spindle shaft, means responsive to said feeler when the work piece machined part arrives at a predetermined angular relation to said spindle shaft to release said gripper and close the clutch of the alined spindle to cause said spindle to rotate said work piece in a definite angular relation to said machined part, and means for further machining the work piece in a definite angular relation to the spindle carrying it whereby the further machining operation is performed in definite angular relation to said machined part.

No references cited.